United States Patent
Park et al.

(10) Patent No.: US 10,531,243 B2
(45) Date of Patent: Jan. 7, 2020

(54) METHOD AND APPARATUS FOR TRANSMITTING SIGNALS HAVING TEMPORAL CORRELATION

(71) Applicants: Samsung Electronics Co., Ltd, Gyeonggi-do (KR); Seoul National University R&DB Foundation, Seoul (KR)

(72) Inventors: Yong-Seok Park, Seoul (KR); Soo-Young Jang, Gyeonggi-do (KR); Daedong Park, Seoul (KR); Seongsoo Hong, Seoul (KR); Sangwook Kim, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 15/344,464

(22) Filed: Nov. 4, 2016

(65) Prior Publication Data

US 2017/0134914 A1    May 11, 2017

(30) Foreign Application Priority Data

Nov. 5, 2015   (KR) ........................ 10-2015-0155157

(51) Int. Cl.
*H04W 4/12* (2009.01)
*H04W 76/11* (2018.01)

(52) U.S. Cl.
CPC .............. *H04W 4/12* (2013.01); *H04W 76/11* (2018.02)

(58) Field of Classification Search
CPC ... H04L 1/1887; H04L 67/325; H04L 1/1678; H04W 4/12; H04W 76/11
See application file for complete search history.

(56) References Cited

U.S. PATENT DOCUMENTS

| 6,570,883 | B1 | 5/2003 | Wong |
| 7,173,945 | B1 | 2/2007 | Liu et al. |
| 8,605,794 | B2 | 12/2013 | Hellwagner et al. |
| 2005/0234862 | A1* | 10/2005 | Shih .................. H03M 13/2714 |
| 2015/0186635 | A1* | 7/2015 | Nakhjiri ................ G06F 21/604 726/17 |
| 2017/0078965 | A1* | 3/2017 | Chen .................. H04W 52/0225 |
| 2017/0150391 | A1* | 5/2017 | Bergquist .......... H04W 28/0236 |
| 2017/0308448 | A1* | 10/2017 | Sato .................... G06F 11/0772 |
| 2017/0373804 | A1* | 12/2017 | Han ........................ H04W 4/70 |
| 2018/0007172 | A1* | 1/2018 | Wang ..................... H04L 69/02 |

* cited by examiner

*Primary Examiner* — Aristocratis Fotakis

(57) ABSTRACT

A method for transmitting data in a mobile device includes transmitting, to a reception device, a connection request message comprising information indicating whether the transmission device supports message transmission having temporal correlation; receiving, from the reception device, a connection response message comprising information indicating whether the reception device supports the message transmission in response to the connection request message; and if both the transmission device and the reception device support the message transmission, transmitting, to the reception device, at least two of messages having temporal correlation, the at least two of messages comprising identification information, wherein the identification information indicates that the at least two of messages have temporal correlation.

16 Claims, 5 Drawing Sheets

| +0...7 | +8...15 | +16...23 | +24...31 |
|---|---|---|---|
| Frame Header (RSV2 = 1) | | | |
| WebSocket Correlation Id | | | |
| Message Id | | | |
| Payload Data | | | |

FIG.3

METHOD AND APPARATUS FOR TRANSMITTING SIGNALS HAVING TEMPORAL CORRELATION

CROSS-REFERENCE TO RELATED APPLICATION(S) AND CLAIM OF PRIORITY

The present application is related to and claims the benefit under 35 U.S.C. § 119(a) of a Korean patent application filed in the Korean Intellectual Property Office on Nov. 5, 2015 and assigned Serial No. 10-2015-0155157, the entire disclosure of which is incorporated herein by reference.

TECHNICAL FIELD

Various embodiments of the present disclosure relate to a method and apparatus for transmitting signals having temporal correlation (or time-correlated signals) by minimizing a transmission time interval between the signals.

BACKGROUND

Internet, which is a human-oriented connectivity network where humans generate and consume information, is now evolving to the Internet of Things (IoT) where distributed entities, such as things, exchange and process information. The Internet of Everything (IoE) has also emerged, which is a combination of the IoT technology and the Big Data processing technology through connection with a cloud server.

As technology elements, such as sensing technology, wired/wireless communication and network infrastructure, service interface technology, and security technology, have been demanded for IoT implementation, a sensor network, a machine to machine (M2M), machine type communication (MTC), and so forth have been recently researched for connection between things.

Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances, advanced medical services, and so forth through convergence and combination between existing information technology and various industries.

As demand for web-based real-time communication for IoT implementation is increasing, a web socket, which is an asynchronous bidirectional communication protocol, has been introduced to overcome limitations of an existing synchronous request-response protocol. In a representative example of the existing synchronous request-response protocol, hypertext transfer protocol (HTTP)-based communication, a client executes a web browser to send an HTTP request to a server. Once the server sends a response to the request to the client, connection with the web browser is terminated, such that HTTP-based communication may be of a half-duplex type. Thus, the HTTP-based communication needs a connection process between the server and the client for each data communication, whereas web-socket-based communication maintains connection until closing handshake is called, and supports server push communication as well as client pull communication depending on asynchronous characteristics. Moreover, the web-socket communication has less overhead in message transmission because of using a message header having a smaller size than the HTTP-based communication.

However, the web socket protocol has insufficient support for data-centric applications.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object of the present disclosure to provide a scheme for supporting data-centric applications when a web-socket protocol is used.

Various embodiments of the present disclosure also provide a scheme for transmitting data having temporal correlation when communication is performed using a web-socket protocol.

Various embodiments of the present disclosure also provide a scheduling scheme that minimizes a transmission time interval between data by using a web-socket protocol.

According to the present disclosure, a method for transmitting data in a mobile device is provided. The method includes transmitting, to a reception device, a connection request message comprising information indicating whether the transmission device supports message transmission having temporal correlation; receiving, from the reception device, a connection response message comprising information indicating whether the reception device supports the message transmission in response to the connection request message; and if both the transmission device and the reception device support the message transmission, transmitting, to the reception device, at least two of messages having temporal correlation, the at least two of messages comprising identification information, wherein the identification information indicates that the at least two of messages have temporal correlation.

According to the present disclosure, a method for receiving a message using a web-socket at a reception device is provided. The method comprises: receiving, from a transmission device, a connection request message comprising information indicating whether the transmission device supports message transmission having temporal correlation; transmitting, to the reception device, a connection response message comprising information indicating whether the reception device supports the message transmission in response to the connection request message; receiving, from the transmission device, messages; if both the transmission device and the reception device support the message transmission, determining that identification information is included in the received messages; and if a same identification information is included in at least two of messages among the received messages, processing the at least two of messages based on temporal correlation of the at least two messages at the same time; wherein the identification information indicates that the at least two of messages have temporal correlation.

According to the present disclosure, a transmission device for transmitting a message using a web-socket is provided. The transmission device comprises: a transceiver configured to transmit, to a reception device, a connection request message comprising information indicating whether the transmission device supports message transmission having temporal correlation, receive, from the reception device, a connection response message comprising information indicating whether the reception device supports the message transmission in response to the connection request message, and if both the transmission device and the reception device support the message transmission, a controller is configured to control the transceiver transmitting, to the reception device, at least two of messages having temporal correlation, the at least two of messages comprising identification information, wherein the identification information indicates that the at least two of messages have temporal correlation.

According to the present disclosure, a reception device for receiving a message using a web-socket is provided. The reception device comprises: a controller configured to control a transceiver; the transceiver configured to receive, from a transmission device, a connection request message comprising information indicating whether the transmission device supports message transmission having temporal correlation, transmit, to the reception device, a connection response message comprising information indicating whether the reception device supports the message transmission in response to the connection request message, and receive, from the transmission device, messages, if both the transmission device and the reception device support the message transmission, the controller configured to determine that identification information is included in the received messages, if a same identification information is included in at least two of messages among the received messages, the controller configured to process the at least two of messages based on temporal correlation of the at least two messages at the same time; wherein the identification information indicates that the at least two of messages have temporal correlation.

Other aspects, advantages, and key features of the present disclosure will be processed together with the attached drawings, and will be apparent to those of ordinary skill in the art from the following detailed description disclosing various embodiments of the present disclosure.

Before undertaking the DETAILED DESCRIPTION OF THE DRAWINGS below, it may be advantageous to set forth definitions of certain words and phrases used throughout this patent document: The terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system or part thereof that controls at least one operation, and such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

Other aspects, advantages, and salient features of the disclosure will become apparent to those skilled in the art from the following detailed description, which, taken in conjunction with the annexed drawings, discloses embodiments of the disclosure.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3 illustrates an example of a web-socket message frame according to an embodiment of the present disclosure;

Throughout the drawings, like reference numerals will be understood to refer to like parts, components, and structures.

DETAILED DESCRIPTION

Figure 1:
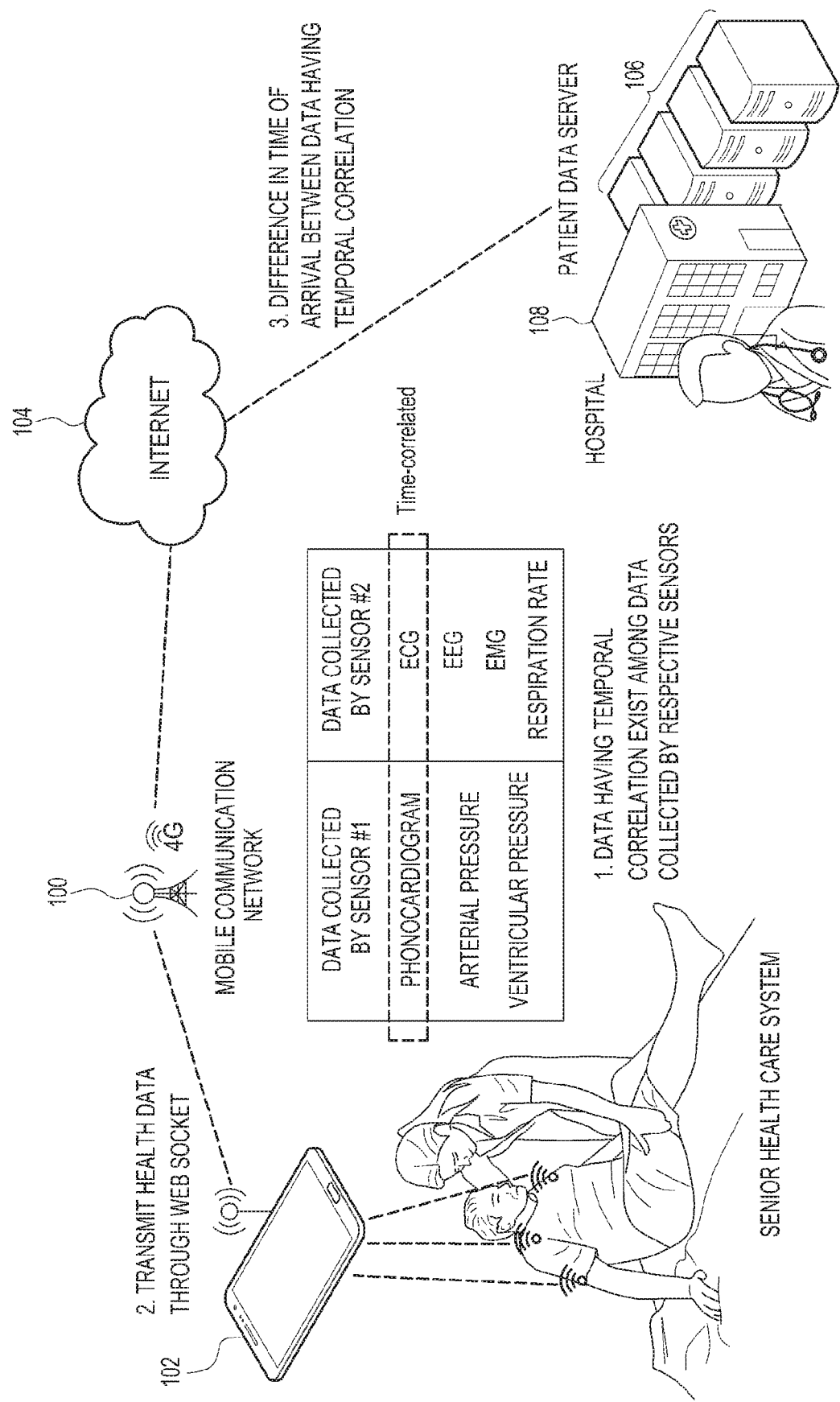
FIG. 1 illustrates an example of an IoT communication environment using a general web-socket protocol.

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Hereinafter, the operating principles of embodiments of the present disclosure will be described with reference to the accompanying drawings. Like components are referred to as like reference numerals even through being illustrated in different drawings, and in the following description, a detailed description of related well-known functions or configurations will not be provided if it unnecessarily obscures the subject matter of the present disclosure. Further, the terminologies to be described below are defined in consideration of functions in the present disclosure and may vary depending on a user's or operator's intention or practice. Therefore, the definitions should be made based on the contents throughout the entire description of the present disclosure.

Various changes may be made to the present disclosure and the present disclosure may have various embodiments which will be described in detail with reference to the drawings. However, the embodiments according to the concept of the present disclosure are not construed as limited to specified disclosures, and include all changes, equivalents, or substitutes that do not depart from the spirit and technical scope of the present disclosure.

It is to be understood that the singular forms "a," "an," and "the" include plural referents unless the context clearly dictates otherwise. Thus, for example, reference to "a component surface" includes reference to one or more of such surfaces.

Although the terms such as "first" and "second" used in the various embodiments of the present disclosure may modify various elements of the various embodiments, these terms do not limit the corresponding elements. These terms may be used for the purpose of distinguishing one element from another element. For example, a first element may be named as a second element without departing from the right scope of the various embodiments of the present disclosure, and similarly, a second element may be named as a first element. The term "and/or" includes a combination of a plurality of related provided items or any one of the plurality of related provided items.

The terms used in the various embodiments of the present disclosure are for the purpose of describing particular embodiments only and are not intended to be limiting. The singular forms are intended to include the plural forms as well, unless the context clearly indicates otherwise. The term "include" or "has" used in the embodiments of the present disclosure is to indicate the presence of features, numbers, steps, operations, elements, parts, or a combination thereof described in the specifications, and does not preclude the presence or addition of one or more other features, numbers, steps, operations, elements, parts, or a combination thereof.

All of the terms used herein including technical or scientific terms have the same meanings as those generally understood by an ordinary skilled person in the related art unless they are defined other. The terms defined in a generally used dictionary should be interpreted as having the same meanings as the contextual meanings of the relevant technology and should not be interpreted as having ideal or exaggerated meanings unless they are clearly defined in the various embodiments.

An electronic device according to various embodiments of the present disclosure may be a device including a communication function. For example, the electronic device may include at least one of a smart phone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), an MP3 player, mobile medical equipment, an electronic bracelet, an electronic necklace, an electronic appcessory, a camera, a wearable device (e.g., a Head-Mounted Device (HMD) such as electronic glasses), an electronic cloth, an electronic bracelet, an electronic necklace, an electronic appcessory, an electronic tattoo, and a smart watch.

According to some embodiments, the electronic device may be a smart home appliance having a communication function. For example, the smart home appliance may include a TV, a digital video disk (DVD) player, audio equipment, a refrigerator, an air conditioner, a vacuum cleaner, an oven, a microwave oven, a washer, a drier, an air cleaner, a set-top box, a TV box (e.g., HomeSync™ of Samsung, TV™ of Apple, or TV™ of Google), a gaming console, an electronic dictionary, a camcorder, and an electronic frame.

According to some embodiments, the electronic device may include at least one of various medical equipment (e.g., magnetic resonance angiography (MRA), magnetic resonance imaging (MRI), computed tomography (CT), computed tomography (CT), an imaging device, or an ultrasonic device), a navigation system, a global positioning system (GPS) receiver, an event data recorder (EDR), a flight data recorder (FDR), a vehicle infotainment device, electronic equipment for ships (for example, navigation system and gyro compass for ships), avionics, a security device, a vehicle head unit, and an industrial or home robot.

According to some embodiments, the electronic device may include a part of a furniture or building/structure having a communication function, an electronic board, an electronic signature receiving device, a projector, and various measuring instruments (for example, a water, electricity, gas, or electric wave measuring device).

The electronic device according to various embodiments of the present disclosure may be one of the above-listed devices or a combination thereof. Note that the electronic device according to various embodiments of the present disclosure is not limited to the above-listed devices.

According to various embodiments, a mobile device and a server may be, for example, electronic devices.

Hereinbelow, an embodiment of the present disclosure will be described using operations between a client and a server. Herein, a client corresponds to operations of an electronic device included therein, and a server also corresponds to operations of an electronic device corresponding to the server.

FIG. 1 illustrates an example of an IoT communication environment using a general web-socket protocol.

Referring to FIG. 1, a representative application of IoT to real life is a senior health care system. In this case, applications or application software provided by the senior health care system are downloaded in a mobile device 102 and data for checking user's health may be collected using the applications. For example, the mobile device 102 includes two sensors for collecting data from the respective applications. In this case, a first sensor may collect data such as a phonocardiogram, an arterial pressure, a ventricular pressure, or the like, and a second sensor may collect data such as an electrocardiogram, an electroencephalogram, an electromyogram, a respiration rate, or the like.

The mobile device 102 provides the collected data to a server 106 for providing the senior health care system by accessing the Internet 104, for example, over a mobile communication network 100. For example, the server 106 may be established in a hospital 108 that provides the senior health care system to manage patient data based on the received data. Herein, the phonocardiogram of the first sensor and the electrocardiogram of the second sensor are data that are simultaneously required for diagnoses of various heart diseases. It may be assumed that there is a time difference between the arrival of the phonocardiogram of the first sensor and the arrival of the electrocardiogram of the second sensor at the server 106. For example, if the phonocardiogram of the first sensor arrives earlier than the electrocardiogram of the second sensor, which then arrives after the elapse of a predetermined time, the phonocardiogram and the electrocardiogram may not be used as data required for a diagnosis of a heart disease. As such, a maximum time-skew limitation may exist between input values needed for deduction of a particular result, and hereinafter, such a relationship will be defined as a temporal correlation between data for convenience.

In another example, it is assumed that a factory uses temperature sensor data X1 and pressure sensor data X2 to control an air-conditioning system. It is also assumed that the input data X1 and X2 generated from the two sensors are simultaneously transmitted to a central control station, such that output data Y needed for air-conditioning control is deduced. In this example, an arrival time difference between data is set to a maximum of 30 milliseconds (C(Y|X1, X2)=30 ms), such that ever-changing temperature and pressure measurements may be regarded as meaningful data. In this case, the temperature sensor data X1 and the pressure sensor data X2 have temporal correlation. Assuming that the air-conditioning system uses a web-socket protocol, it is difficult to guarantee deduction of output data needed for the above-described air-conditioning control because a data transmission method considering temporal correlation is not defined in web-socket protocol-based communication.

Therefore, various embodiments of the present disclosure provide a scheme for transmitting data having temporal correlation when communication is performed using the web-socket protocol. More specifically, an embodiment of the present disclosure includes a method for indicating support for transmission of data having temporal correlation in a request message sent to a server when connection for communication between a client and the server is generated, and configuring a message including data having temporal correlation, and a method for scheduling the messages.

First, according to an embodiment of the present disclosure, support for transmission of the data having temporal correlation is indicated in the request message sent to the server when connection for communication between the client and the server is generated. In an embodiment of the present disclosure, the client and the server simultaneously support processing of messages having temporal correlation. Furthermore, an embodiment of the present disclosure includes a procedure for indicating support for processing of messages having temporal correlation when connection between the client and the server is set up. More specifically, in embodiments of the present disclosure, by defining an additional function that is not included in existing web-socket protocol specifications, information related to transmission of messages having temporal correlation is indicated using an additional function for supporting functional extension of a web socket, namely, web socket extension.

Figure 2:
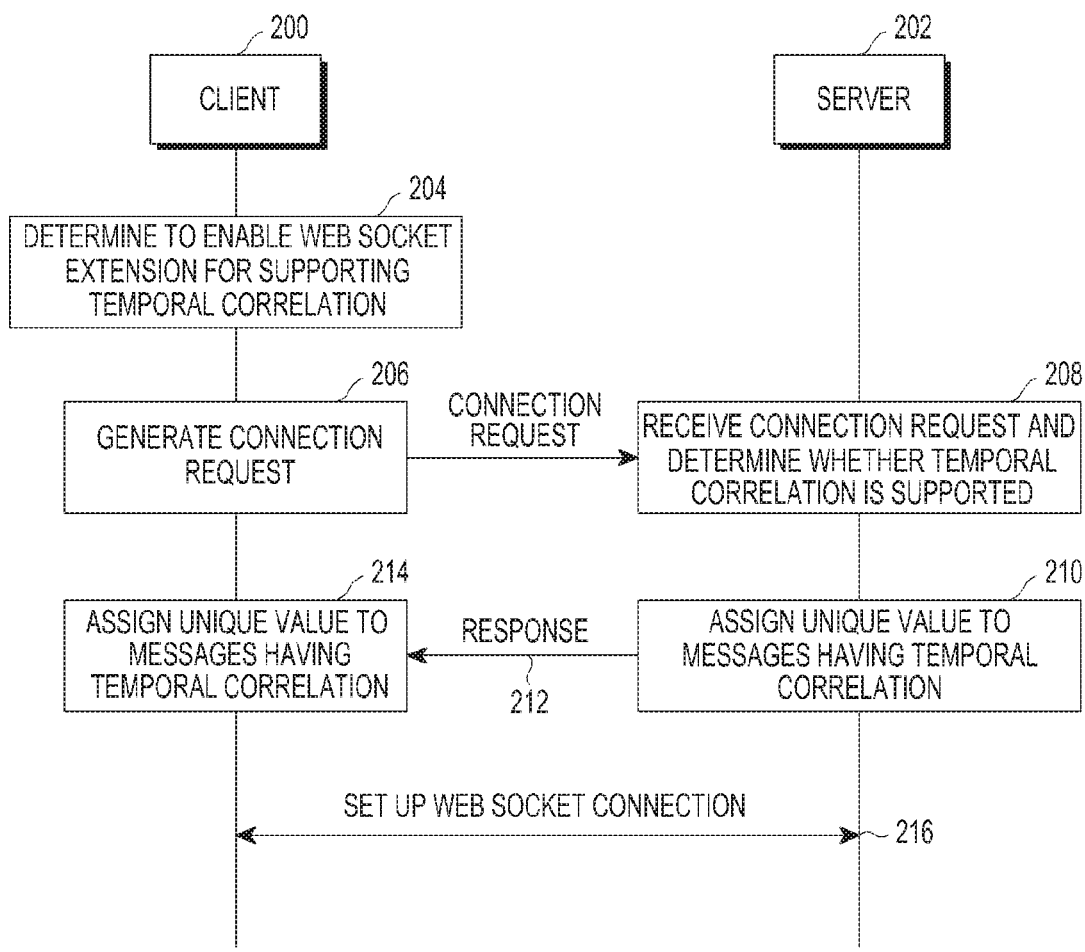
FIG. 2 illustrates an example process of negotiation of web-socket extension that processes messages having temporal correlation according to an embodiment of the present disclosure.

FIG. 2 illustrates an example process of negotiation of web-socket extension that processes messages having temporal correlation according to an embodiment of the present disclosure.

Referring to FIG. 2, a client 200 of an application using the web socket protocol determines that data having temporal correlation is generated when the application is used. In this case, the client 200 determines to enable web socket extension for transmission of a message including data having temporal correlation according to an embodiment of the present disclosure in operation 204. To communicate with a server 202 that provides a service through the application by using the web socket protocol, the client 200 generates and sends a connection request to the server 202 in operation 206. Although not shown in FIG. 2, transmission control protocol (TCP)/Internet protocol (IP) connection between the server 202 and the client 200 needs to be performed for web-socket-based communication between the server 202 and the client 200. Thus, it is understood that operation 206 is performed after completion of TCP/IP connection between the server 202 and the client 200. The connection request according to embodiments of the present disclosure may indicate whether transmission of messages having temporal correlation is supported, which is an option the client 200 adds, and also includes information related to transmission of messages having temporal correlation, in a web socket extension field of a header thereof.

In operation 208, the server 202 determines whether support for transmission of messages having temporal correlation is indicated in the web socket extension field of the header of the received connection request. If support for transmission of the messages having temporal correlation is not indicated in the web socket extension field, the server 202 performs a general procedure for sending a response to the connection request, though not shown in FIG. 2.

If support for transmission of the messages having temporal correlation is indicated in the web socket extension field, the server 202 determines whether to support transmission of the messages having temporal correlation in operation 210. The server 202 performs an operation for processing the messages having temporal correlation according to an embodiment of the present disclosure. That is, the server 202 assigns and records a unique value indicating temporal correlation in respective message frames to be transmitted and received, according to embodiments of the present disclosure. This operation will be described in more detail with reference to FIG. 3. In operation 212, the server 202 generates a response to the connection request and sends the response to the client 200. The response according to an embodiment of the present disclosure also indicates support for transmission of messages having temporal correlation in a header thereof.

In operation 214, the client 200 also assigns and records a unique value indicating temporal correlation in respective message frames to be transmitted and received, according to an embodiment of the present disclosure. This operation will be described in more detail with reference to FIG. 3. In operation 216, a connection based on the web-socket protocol is established between the client 200 and the server 202. Although not shown in FIG. 2, the client 200 and the server 202 asynchronously transmit and receive messages having temporal correlation generated according to an embodiment of the present disclosure through the connection.

Next, according to an embodiment of the present disclosure, in messages including data to be transmitted and received between a client 200 and a server 202, temporal correlation may be indicated as below. In an embodiment of the present disclosure, a unique value indicating temporal correlation may be assigned to messages having temporal correlation. That is, according to an embodiment of the present disclosure, non-redundant unique values are assigned to messages having no temporal correlation, and the identical value is assigned to messages having temporal correlation. A unique value according to an embodiment of the present disclosure may include, for example, two numbers. The first number indicates a message identifier (message ID). The message identifier may indicate a temporal order of messages having temporal correlation, which are transmitted through an identical web socket. Herein, the message identifier has a unique value for each message transmitted in single web socket connection, such that messages transmitted through single web socket connection have different message identifiers. The second number indicates a correlation identifier (correlation ID). Herein, the correlation identifier is assigned as an identical value to web socket connections for transmitting messages having temporal correlation. That is, two or more web socket connections for transmitting messages having temporal correlation have an identical correlation identifier. As a result, the correlation identifiers of the messages having temporal correlation have an identical value. Likewise, the message identifiers of the messages having temporal correlation have an identical value.

According to an embodiment of the present disclosure, a unique value indicating temporal correlation is included in respective message frames. That is, frames of general messages having no temporal correlation include a frame header and payload data, whereas fields inputting unique values indicating temporal correlation are added to frames of messages having temporal correlation according to an embodiment of the present disclosure.

FIG. 3 illustrates an example of a web-socket message frame 301 according to an embodiment of the present disclosure.

Referring to FIG. 3, a web socket message frame 301 includes a field for a unique value indicating temporal correlation, that is, a message id field 304 and a web socket correlation id field 302, as well as a frame header 300 and payload data 306. In the web socket message frame 301 according to an embodiment of the present disclosure, an RSV2 bit of the frame header is set to "1", indicating that the message has temporal correlation. According to an embodiment of the present disclosure, a mobile device generating the web socket message frame 301 identifies web socket connection and an order of a message as described above and assigns the message ID and the correlation ID to the message frame 301 having temporal correlation, and records the assigned message ID and correlation ID in corresponding fields 304 and 302.

According to an embodiment of the present disclosure, a server having received the web socket message frame 301 obtains a value from the message ID field 304 and the web socket correlation ID field 302 of the frame 301 to determine message frames having identical message ID and correlation ID, and simultaneously processes the determined message frames and the received frame.

An embodiment of the present disclosure includes a scheduling scheme for minimizing a transmission time interval between messages having temporal correlation based on temporal correlation for message frames to be transmitted and received through web socket connection.

Figure 4:
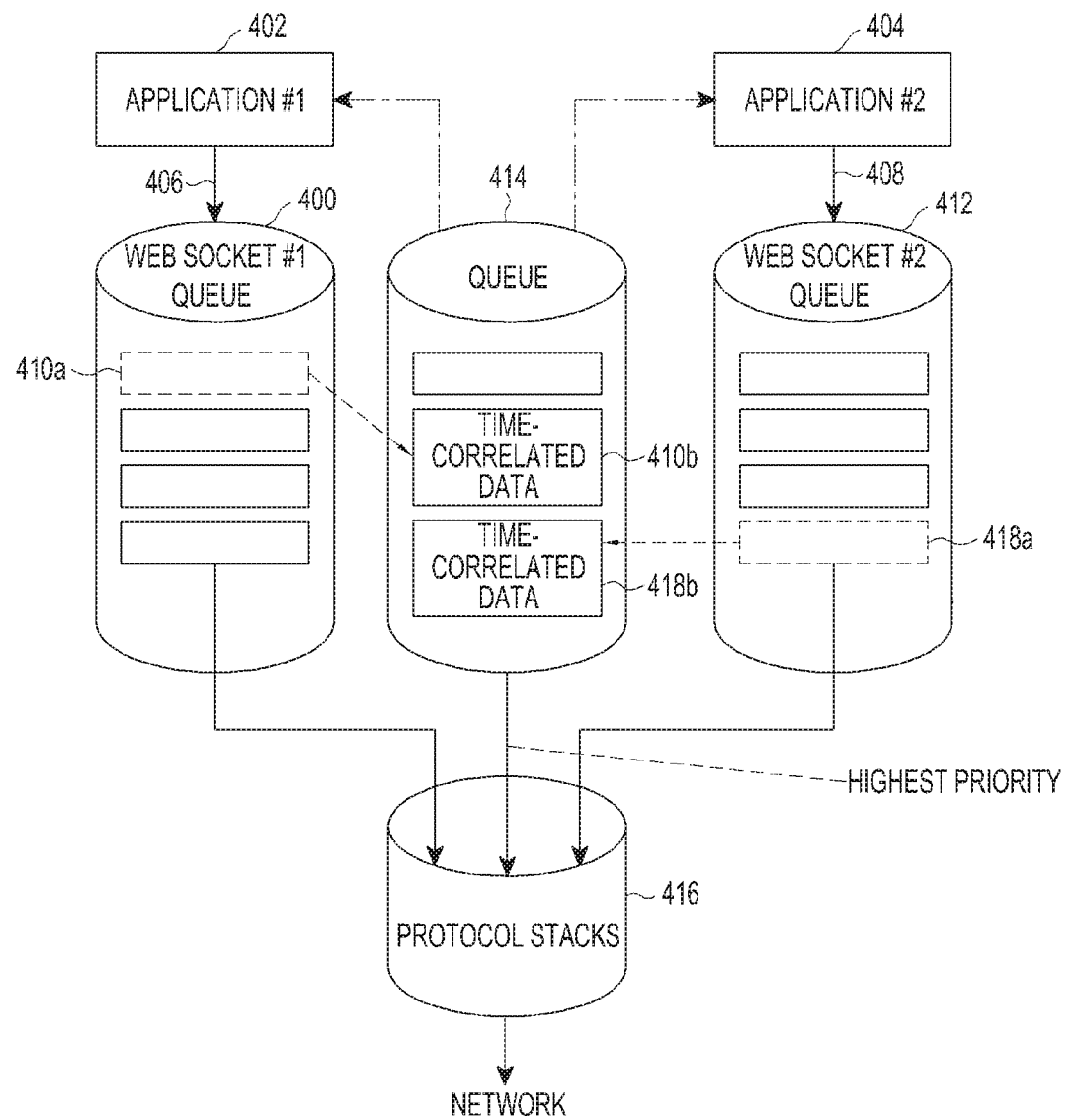
FIG. 4 illustrates an example of scheduling between messages having temporal correlation when a client transmits the messages according to an embodiment of the present disclosure.

FIG. 4 illustrates an example of scheduling between messages having temporal correlation when a client transmits the messages according to an embodiment of the present disclosure.

Referring to FIG. 4, for example, two applications supporting an identical service are installed in a mobile device of a client. In this case, according to an embodiment of the present disclosure, an application #1 402 and an application #2 404 respectively form a web sockets connection 406 and 408 with respective web socket servers #1 and #2 and process information generated from an application and an applied sensor to request transmission through web socket connection.

In an embodiment of the present disclosure, the mobile device includes a separate queue 414 for preferentially transmitting messages having temporal correlation out of messages transmitted over a network through a web socket #1 and a web socket #2 over the network, in addition to a queue 400 for storing messages transmitted and received through the web socket #1 and a queue 412 for storing messages transmitted and received through the web socket #2. The mobile device also includes a protocol stack 416, below an application layer, including actual physical connection.

Messages having no temporal correlation out of messages stored in the web socket queue #1 400 and the web socket queue #2 412 of the respective web sockets connections #1 and #2 are sequentially transmitted through the protocol stack 416, depending on a state of the network.

Meanwhile, according to an embodiment of the present disclosure, if transmission of a message 410a, 418a having temporal correlation over a network is requested through each the application #1 402 and the application #2 404, the message 410b, 418b is stored in the separate queue 414, instead of being stored in the web socket queue #1 400 & #2 412 corresponding to web socket connection thereof. According to an embodiment of the present disclosure, if receiving the first message having temporal correlation, the queue 414 delays transmission of the message, instead of immediately transmitting the message. The queue 414 identifies a subsequent input message upon input of the subsequent message to determine whether the subsequent input message is the second message having temporal correlation with the first message. If message identifiers and correlation identifiers obtained from frames of the input messages have identical values, the queue 414 may determine that those messages are to be transmitted together. If determining that the subsequent input message is the second message, the queue 414 requests transmission of the first message and the second message over the network. Therefore, according to an embodiment of the present disclosure, a transmission time difference does not occur between the first message and the second message.

According to an embodiment of the present disclosure, the separate queue 414 has the higher priority than other web socket connections, that is, the highest priority, such that messages 410b, 418b stored in the queue 414 are preferentially transmitted when compared to messages of other connections. In this way, according to an embodiment of the present disclosure, it is possible to prevent transmission of messages having temporal correlation from being delayed and to compensate for an already delayed transmission time.

Figure 5:
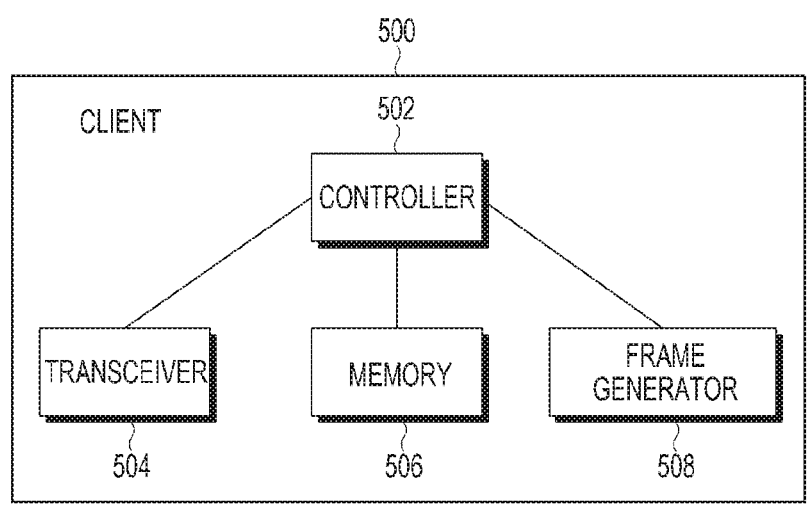
FIG. 5 illustrates a block diagram of a mobile device according to an embodiment of the present disclosure.

FIG. 5 illustrates a block diagram of a mobile device 500 according to an embodiment of the present disclosure.

Referring to FIG. 5, a mobile device 500 may include a controller 502, a transceiver 504, a memory 506, and a frame generator 508. Such elements of the mobile device 500 may be divided into sub-elements or integrated into one element, depending on implementation of operators or embodiments. Herein, the controller 502 controls all operations of the elements of the mobile device 500 or some operations thereof. For convenience, a description will be made of an example where the controller 502 controls some operations of the mobile device 500. For convenience, it is assumed that the mobile device 500 includes at least two applications 402, 404 for receiving an identical service and data, generated through each of the two or more applications 402, 404, that has temporal correlation when being transmitted to a server for providing the service. According to an embodiment of the present disclosure, once the mobile device 500 has determined to enable web socket extension of a frame structure for indicating support for temporal correlation, the controller 502 generates a frame indicating support for temporal correlation as described with reference to FIG. 2 through the frame generator 508, when sending a request for connection with a server. The connection request generated through the frame generator 508 is transmitted to the server 202 according to an instruction of the controller 502. The controller 502 determines support for temporal correlation, which is indicated in a response (operation 212) received from the server 202 through the transceiver 504. Once the mobile device 500 has determined that the temporal correlation is supported, the controller 502 controls the frame generator 508 to configure the web socket message frame 301 including data to be transmitted through web socket connection as illustrated in FIG. 3, according to an embodiment of the present disclosure. Then, the frame generator 508 assigns a unique value to indicate temporal correlation when transmitting data generated through the two or more applications supporting the service over the network. Herein, the unique value is assigned as described with reference to FIG. 3.

The memory 506 includes a queue 400 and 412 for storing data generated through the two or more applications 402, 402 and a separate queue (414 of FIG. 4) for storing data having temporal correlation. In response to an instruction of the controller 502, the memory 506 stores data having temporal correlation, out of data stored in a queue corresponding to each application, in the separate queue 414. The transceiver 504 simultaneously transmits messages 410b and 418b including data having temporal correlation from the queue 414 over the network. The messages have an identical unique value, that is, identical message identifiers and correlation identifies, through the controller 502.

The server 202 according to an embodiment of the present disclosure is also configured similar to the mobile device 500 illustrated in FIG. 5. For convenience, referring to FIG. 5, in the server according to an embodiment of the present disclosure, the controller 502 controls the frame generator 508 to indicate support for temporal correlation as described with reference to FIG. 2 when generating a response to a web socket connection request received from the client.

Based on the structure described with reference to FIG. 4, the mobile device simultaneously transmits data having temporal correlation, generated from at least two applications supported by the server. Hence, in light of the server, a time delay difference in reception from the mobile device through the transceiver 504 between data having temporal correlation generated from the at least two applications may be reduced.

According to an embodiment of the present disclosure, by indicating support for temporal correlation in web socket connection between the client and the server and assigning a unique value indicating temporal correlation in a message including data to be transmitted and received through the connection, an application, such as IoT, sensor network, or the like, which uses web socket, may effectively represent a relationship between data having temporal relation, and the temporal correlation between the data is processed in a web socket layer in place of an application stage, thus reducing a burden on an application developer. Moreover, by providing a minimum transmission time interval between data having temporal correlation, an accurate result value may be deduced based on corresponding data.

Particular aspects of the present disclosure may also be implemented as a computer readable code in a computer readable recording medium. The computer readable recording medium may be any type of data storage device that may store data readable by a computer system. Examples of record-mediums readable by the computer may include a read-only memory (ROM), a random-access memory (RAM), a compact disc-read only memory (CD-ROM), magnetic tapes, floppy disks, optical data storage devices, carrier waves (such as data transmission through the Internet). The computer readable recording medium may be distributed through computer systems connected over a network, and thus the computer readable code is stored and executed in a decentralized manner. Further, functional programs, codes and code segments for achieving the present disclosure may be easily interpreted by programmers skilled in the art which the present disclosure pertains to.

The apparatus and method according to an embodiment of the present disclosure may be implemented by hardware, software, or a combination of hardware and software. Such software may be stored, whether or not erasable or re-recordable, in a volatile or non-volatile storage such as a read-only memory (ROM), a memory such as a random access memory (RAM), a memory chip, a device, or an integrated circuit; and an optically or magnetically recordable and machine (e.g., computer)-readable storage medium such as a compact disc (CD), a digital versatile disk (DVD), a magnetic disk, or a magnetic tape. It can be seen that the method according to the present disclosure may be implemented by a computer or a portable terminal which includes a controller and a memory, and the memory is an example of a machine-readable storage medium which is suitable for storing a program or programs including instructions for implementing the embodiment of the present disclosure.

Therefore, the present disclosure includes a program including codes for implementing an apparatus or method claimed in an arbitrary claim and a machine (computer)-readable storage medium for storing such a program. The program may be electronically transferred through an arbitrary medium such as a communication signal delivered through a wired or wireless connection, and the present disclosure properly includes equivalents thereof.

The apparatus according to an embodiment of the present disclosure may receive and store the program from a program providing device connected in a wired or wireless manner. The program providing device may include a memory for storing a program including instructions for instructing the apparatus to execute a preset method, information necessary for the method, a communication unit for performing wired or wireless communication with the apparatus, and a controller for transmitting a corresponding program to the apparatus at the request of the apparatus or automatically.

Although the present disclosure has been described with embodiments, various changes and modifications may be suggested to one skilled in the art. It is intended that the present disclosure encompass such changes and modifications as fall within the scope of the appended claims.

What is claimed is:

1. A method for transmitting data using a web-socket at a transmission device, the method comprising:
   identifying that first data is included in at least two data having a correlation to be transmitted within a limit time;
   in response to the first data being included in the at least two data, storing the first data in a first queue;
   identifying that second data is included in the at least two data;
   in response to the second data being included in the at least two data, storing the second data in the first queue;
   transmitting the first data from the first queue to a server;
   transmitting the second data from the first queue to the server within the limit time from a time point that the first data was transmitted; and
   in response to third data being not included in the at least two data, storing the third data in a second queue for a first application and transmitting the third data from the second queue to the server after the first data and the second data are transmitted,
   wherein, when the second data is received within the limit time from a time point that the first data was received, the first data and the second data are used to obtain data by the server.

2. The method of claim 1, wherein the first data is transmitted using a first web socket, and the second data is transmitted using a second web socket, and
   wherein the first web socket and the second web socket support an asynchronous bidirectional communication.

3. The method of claim 1, wherein the limit time is a maximum arrival interval between the first data and the second data to be required to obtain output data by the server.

4. The method of claim 1, wherein each of the first data and the second data comprises common information indicating a service provided by the server and dedicated information indicating an order used by the server.

5. The method of claim 1, further comprising:
   transmitting, to the server, a connection request comprising information indicating that the transmission device supports data transmission within the limit time; and receiving, from the server, a connection response comprising information indicating that the server supports the data transmission in response to the connection request and a value allocated for the data transmission.

6. A method for receiving data using a web-socket at a server, the method comprising:
   receiving, from a transmission device, a connection request comprising information indicating that the transmission device supports data transmission within a limit time;
   identifying whether the server supports the data transmission;
   in response that the server supports the data transmission, allocating a value for the data transmission;
   in response to the connection request, transmitting, to the transmission device, a connection response comprising the value and information indicating that the server supports the data transmission;
   receiving, from the transmission device, first data, second data, and third data; and
   if the first data and the second data are received within the limit time, obtaining output data based on the first data and the second data;
   wherein the third data, being not included in at least two data having a correlation to be transmitted within the limit time, is received from the transmission device over the limit time after receiving the second data.

7. The method of claim 6, wherein the limit time is a maximum arrival interval between the first data and the second data to be required to obtain output data by the server.

8. The method of claim 6, wherein each of the first data and the second data comprises common information indicating a service provided by the server and dedicated information indicating an order used by the server.

9. A transmission device for transmitting data using a web-socket, the transmission device comprising:
   a controller configured to:
      identify that first data is included in at least two data having a correlation to be transmitted within a limit time,
      in response that the first data is included in the at least two data, store the first data in a first queue,
      identify that second data is included in the at least two data,
      in response that the second data is included in the at least two data, store the second data in the first queue, and
      in response to third data being not included in the at least two data, store the third data in a second queue for a first application; and
   a transceiver configured to transmit the first data from the first queue to a server, transmit the second data from the first queue to the server within the limit time from a time point that the first data is transmitted, and transmit the third data from the second queue to the server after the first data and the second data are transmitted,
   wherein, when the second data is received within the limit time from a time that the first data was received, the first data and the second data are used to obtain output data by the server.

10. The transmission device of claim 9, wherein the first data is transmitted using a first web socket, and the second data is transmitted using a second web socket, and wherein the first web socket and the second web socket support an asynchronous bidirectional communication.

11. The transmission device of claim 9, wherein the limit time is a maximum arrival interval between the first data and the second data to be required to obtain output data by the server.

12. The transmission device of claim 9, wherein each of the first data and the second data comprises common information indicating a service provided by the server and dedicated information indicating an order used by the server.

13. The transmission device of claim 9, wherein the transceiver is configured to transmit, to the server, a connection request comprising information indicating that the transmission device supports data transmission within the limit time, and receive, from the server, a connection response comprising information indicating that the server supports the data transmission in response to the connection request and a value allocated for the data transmission.

14. A server for receiving data using a web-socket, the server comprising:
   a transceiver configured to receive, from a transmission device, a connection request comprising information indicating that the transmission device supports data transmission within a limit time; and
   a controller configured to:
      identify whether the server supports the data transmission,
      in response that the server supports the data transmission, allocate a value for the data transmission,
      in response to the connection request, control the transceiver to transmit, to the transmission device, a connection response comprising the value and information indicating that the server supports the data transmission,
      receive, from the transmission device, first data, second data, and third data, and
      if the first data and the second data are received within the limit time, obtain output data based on the first data and the second data;
   wherein the third data, being not included in at least two data having a correlation to be transmitted within the limit time, is received from the transmission device over the limit time after receiving the second data.

15. The server of claim 14, wherein the limit time is a maximum arrival interval between the first data and the second data to be required to obtain output data by the server.

16. The server of claim 14, wherein each of the first data and the second data comprises common information indicating a service provided by the server and dedicated information indicating an order used by the server.

* * * * *